United States Patent [19]

Cebollero

[11] Patent Number: 4,841,599
[45] Date of Patent: Jun. 27, 1989

[54] SPRING MECHANISM FOR THE HINGE OF A MOTOR-VEHICLE SUN VISOR

[76] Inventor: Carlos G. Cebollero, 180, Calle Rocafort, 08029 Barcelona, Spain

[21] Appl. No.: 159,832

[22] Filed: Feb. 24, 1988

[30] Foreign Application Priority Data

Feb. 27, 1987 [ES] Spain .................................. 8700679

[51] Int. Cl.$^4$ .............................................. E05F 1/08
[52] U.S. Cl. ...................................... 16/297; 16/339; 16/342; 16/386; 296/97.12; 296/97.13
[58] Field of Search ................. 16/226, 228, 297, 303, 16/339, 341, 342, 380, 381; 296/9 KK, 97 H, 97 R, 97.12, 97.13, 97.9; 403/292, 329

[56] References Cited

U.S. PATENT DOCUMENTS 4,610,443 9/1986 Ebert et al. .................... 296/97 R
4,617,699 10/1986 Nakamura ..................... 296/97 K
4,702,513 10/1987 Ebert et al. .................... 296/97 H

FOREIGN PATENT DOCUMENTS 1452220 10/1976 United Kingdom ............. 296/97 H

Primary Examiner—Nicholas P. Godici
Assistant Examiner—Edward A. Brown
Attorney, Agent, or Firm—Michael J. Striker

[57] ABSTRACT

A motor vehicle sun visor (P) has a substantially tubular spring mechanism (R) fitted in its hinge-rod housing for gripping the rod to retain the visor in a desired angular position on the rod in use. The spring mechanism is formed from a single piece of sheet spring metal and is of substantially tubular form with a longitudinal curved wall (1) connected at opposite longitudinal edges to two parallel flat walls (2, 2') which grip the hinge rod in use. The other edges of the flat walls are joined to two curved wall portions whose free edges (6, 6') define an aperture. The curved wall and wall portions are a close fit in the tubular housing (8) with a longitudinal projection (7) thereof fitted in the aperture to prevent relative rotation of the spring mechanism and the housing, and the spring mechanism has outwardly-projecting tabs (5, 5', 5'') which snap engage in a recess (10) in the housing wall to restrain the spring mechanism against axial movement in the housing.

9 Claims, 1 Drawing Sheet

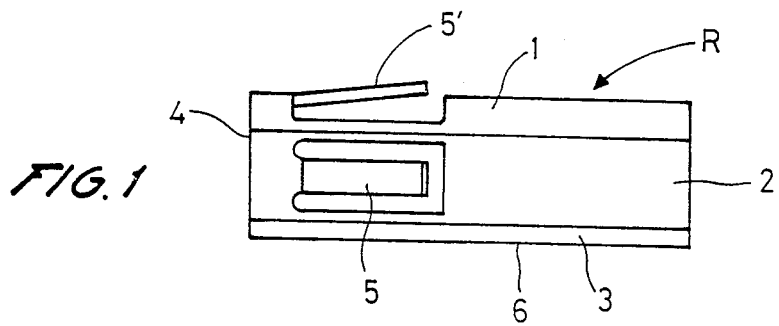
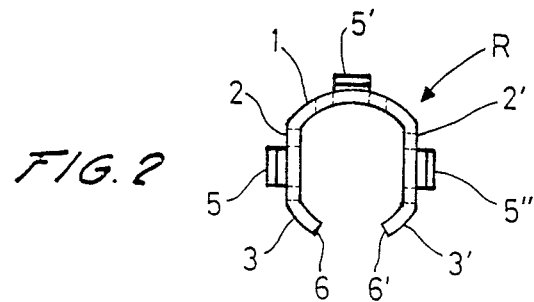
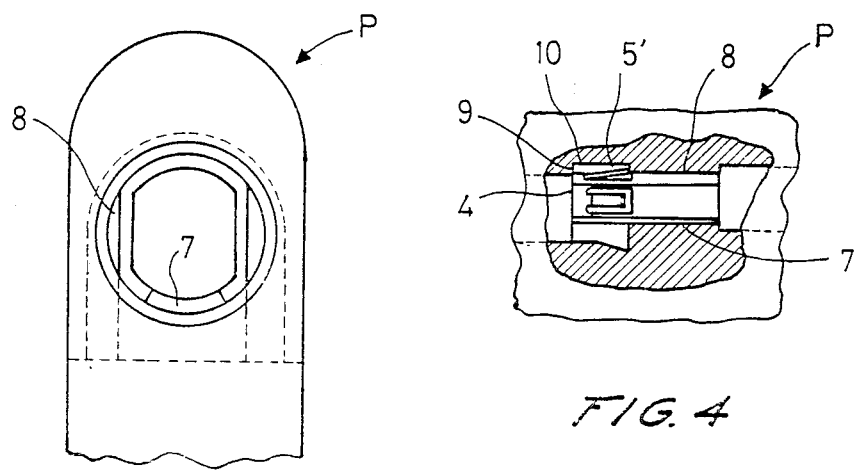

4,841,599

SPRING MECHANISM FOR THE HINGE OF A MOTOR-VEHICLE SUN VISOR

BACKGROUND OF THE INVENTION

The present invention relates to spring mechanisms for the hinges of motor-vehicle sun visors and to sun visors incorporating such spring mechanisms.

SUMMARY OF THE INVENTION

The object of the invention is to provide a new spring mechanism for retaining a motor-vehicle sun visor in a desired position of use which has greater functional efficiency and is easier to assemble than known spring mechanisms designed for the same purpose.

In keeping with this object, and others that will become apparent later on, one aspect of the invention resides in a spring mechanism for a hinge of a sun visor of a motor-vehicle that includes a resilient sheet element having a longitudinally curved wall portion with two opposite longitudinal edges, two flat parallel wall portions that are parallel to each other, and two curved wall portions having free edges facing each other so as to define an aperture. The two flat parallel wall portions extend between the two opposite longitudinal edges and the two curved wall portions. The resilient sheet element has a single piece construction. At least one retaining tab extending outward from said resilient sheet element is provided to retain the resilient sheet material.

It is a further object to fit the resilient sheet material with the tab into a hinge-rod housing of a sun visor so that the flat wall portions grip a rod which extends axially through the tubular mechanism and the housing. In this position the aperture between the free ends of the two curved portions cooperates with a projection provided on the inner wall of the housing to prevent relative rotation of the resilient sheet material and the housing while the retaining tab engages a recess in the housing wall to oppose relative axial movement. The retaining tab is formed as a spring.

It is an additional object to form the resilient sheet element symmetrical about a longitudinal plane of symmetry which passes through the longitudinal curved wall portion and which bisects the aperture. The two flat parallel faces are arranged parallel to this longitudinal plane of symmetry.

It is still another object that three retaining tabs project respectively from the longitudinal curved wall portion and the two flat wall portions. The retaining tabs each diverge outward from the resilient sheet element in the same direction symmetrically at an acute angle with respect to a longitudinal axis of the resilient sheet material. The resilient sheet element and the tabs form a single piece structure.

It is yet another object that the resilient sheet element be composed of spring metal and be substantially tubular in form.

It is an additional object to provide a tubular housing with an inner wall. All of the curved wall portions are fitted against the inner wall. The two flat parallel wall portions thereby are arranged so that a space forms between the two flat wall portions and the inner wall. The two flat parallel wall portions are formed to resiliently expand into this space to accommodate gripping the hinge rod between the two flat parallel wall portions to thereby retain a sun visor on the hinge rod in a desired angular position of use. A relative rotation of the resilient sheet element and the housing is prevented by a projection formed in the housing and fitted between the free edges of the two curved wall portions in the aperture. The housing has a recess in which is engaged the retaining tab so as to restrain the resilient sheet element against axially moving in the housing.

It is yet another object to provide the housing with an open end. The resilient sheet element has a receiving area into which one tab is depressible so that the tab extends outwardly no further than an outer surface of the resilient sheet element. The resilient sheet element is formed so as to be slidable into the housing through the open end while the one tab is depressed into the receiving area. The one tab is formed to engage the recess in the housing upon reaching the recess by snapping into engagement so as to prevent a withdrawal of the resilient sheet element from the housing.

It still another object to provide the housing with a wall against which a longitudinal end of said resilient sheet element abuts as the one tab reaches the recess.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of the spring mechanism of the present invention;

FIG. 2 is an end view taken from the right side of FIG. 1;

FIG. 3 is a view similar to FIG. 2 as arranged within a hinge housing of a sun visor; and FIG. 4 is a side view corresponding to FIG. 1 as arranged within the hinge housing of a sun visor, as in FIG. 3, but with the housing partially sectioned.

DESCRIPTION OF THE PREFERRED EMBODIMENT

Turning now to the drawings, FIGS. 1 and 2 depict a spring mechanism R having a single piece structure composed of a resilient sheet material, preferably metal such as spring steel. The spring mechanism R is substantially tubular in shape with a longitudinal plane of symmetry and with a longitudinal aperture bisected by this plane.

The spring mechanism R has a curved wall 1 with longitudinal edges connected to two flat walls 2, 2'. The flat walls 2, 2' are parallel to the plane of symmetry and therefore parallel to each other. The flat walls 2, 2' are also each connected to a respective curved wall portion 3, 3' whose free edges 6, 6' are separated by a predetermined distance that defines the longitudinal aperture. The curved wall 1 and the two flat walls 2, 2' have respective longitudinally-elongated apertures or receiving areas near one end 4 of the mechanism R with respective tabs 5, 5', 5''. The tabs are composed of the spring metal and project outward from edges of the apertures adjacent the end 4. Each tab 5, 5', 5'' extends across its respective aperture and also diverges outward slightly at an acute angle with respect to the longitudinal axis of the spring mechanism R. The tabs 5, 5', 5'' are provided to retain the spring mechanism R in the hinge housing of a sun visor.

The end portion of a motor-vehicle sun visor P is shown in FIGS. 3 and 4 and incorporates a housing 8 for the hinge rod (not shown) of the visor and also for the spring mechanism R. The housing 8 has a generally-cylindrical portion in which the curved wall 1 and wall portions 3, 3' of the spring R are a close fit. A longitudinal projection 7 is close fit between the opposing edges 6, 6' of the wall portions 3, 3' so as to prevent the spring R from rotating within the housing 8. The wall of the housing 8 also has a recess 10 which accommodates the tabs 5, 5', 5" of the spring R.

The spring mechanism R is slid axially into the housing 8 from the right hand end of the housing shown in FIG. 4. During this axial sliding, the tabs 5, 5', 5" are resiliently depressed into their respective apertures or receiving areas in the walls 1, 2, 2'. When the spring R is fully inserted, its end 4 abuts an end shoulder 9 of the housing 8 and the tabs 5, 5', 5" spring out into the recess 10 in the housing wall to prevent withdrawal of the spring mechanism R from the housing 8.

A hinge rod of a sun visor is inserted through the through-hole of the spring mechanism R and is gripped resiliently between the two generally-flat walls 2, 2', which can flex apart into the adjacent space in the housing 8 to accommodate the rod as required. When the motor vehicle is traveling over normal road surfaces, the sizing of the hinge rod and the spring R and the resiliency of the spring R are such that a hinge rod with a cylindrical shape is held firmly in any selected angle of inclination of the sun visor. When the motor-vehicle will travel over uneven ground resulting in a great deal of vibration, a hinge-rod may be used which, instead of being completely cylindrical, has longitudinal flats on its circumferential surface, that is, parallel to generatrices of the cylinder. In this case, the two flat walls 2, 2' of the spring mechanism R engage the longitudinal flats on the hinge rod to establish specific angular positions of the visor P which are particularly stable. Indeed, it will be appreciated, that, to pivot the visor on such a rod, the two flat walls, 2, 2' will have to be forced apart to pass over the larger-diameter portions of the rod between the flats.

It will be understood that each of the elements described above, or two or more together, may also find a useful application in other types of constructions differing from the types described above.

While the invention has been illustrated and described as embodied in a spring mechanism for the hinge of a motor-vehicle sun visor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A spring mechanism for a hinge of a sun visor of a motor-vehicle and a housing for the spring mechanism, comprising:
   a spring mechanism having a resilient sheet element, said resilient sheet element including a longitudinal curved wall portion with two opposite longitudinal edges, two flat parallel wall portions that are parallel to each other, and two curved wall portions having free edges facing each other so as to define an aperture, said two flat parallel wall portions extending between said two opposite longitudinal edges and said two curved wall portions, said resilient sheet element having a single piece structure, said resilient sheet element being of a tubular shape, said spring mechanism also including means for retaining said resilient sheet element and including at least one retaining tab extending outward from said resilient sheet element;
   a housing with an inner wall, all of said curved wall portions being fitted against said inner wall, said housing being tubular so that said tubular resilient sheet element can be inserted into said tubular housing by displacement only in a longitudinal direction, said two flat parallel wall portions thereby being arranged so that a space forms between said two flat wall portions and said inner wall, said two flat parallel wall portions being formed to resiliently expand into said space to accommodate and grip between said two flat parallel wall portions, a hinge rod insertable in the longitudinal direction to thereby retain a sun visor on the hinge rod in a desired angular position of use; and
   means for preventing a relative rotation of said resilient sheet element and said housing and including a projection formed in said housing and fitted between said free edges of said two curved wall portions in said aperture, said housing having a recess in which is engaged said retaining tab so as to restrain said resilient sheet element against axially moving in said housing.

2. The spring mechanism as defined in claim 1, wherein said resilient sheet element is symmetrical about a longitudinal plane of symmetry which passes through said longitudinal curved wall portion and which bisects said aperture, said two flat parallel faces being arranged parallel to said longitudinal plane of symmetry.

3. The spring mechanism as defined in claim 1, wherein said resilient sheet element is composed of spring metal.

4. The spring mechanism as defined in claim 1, wherein said resilient sheet element and said one tab is formed together to have a single piece structure.

5. A spring mechanism for a hinge of a sun visor of a motor-vehicle, comprising:
   a resilient sheet element having a longitudinal curved wall portion with two opposite longitudinal edges, two flat parallel wall portions that are parallel to each other, and two curved wall portions having free edges facing each other so as to define an aperture, said two flat parallel wall portions extending between said two opposite longitudinal edges and said two curved wall portions, said resilient sheet element having a single piece structure; and
   means for retaining said resilient sheet element and including at least one retaining tab extending outward from said resilient sheet element, said retaining means including three such retaining tabs projecting respectively from said longitudinal curved wall portion and said two flat wall portions, said resilient sheet element having a longitudinal axis, said retaining tabs each diverging outward from said resilient sheet element in the same direction symmetrically at an acute angle with respect to said longitudinal axis, said resilient sheet element and all of said tabs having a single piece structure.

6. A spring mechanism for a hinge of a sun visor of a motor-vehicle and a housing for the spring mechanism, comprising:

a spring mechanism having a resilient sheet element, said resilient sheet element including a longitudinal curved wall portion with two opposite longitudinal edges, two flat parallel wall portions that are parallel to each other, and two curved wall portions having free edges facing each other so as to define an aperture, said two flat parallel wall portions extending between said two opposite longitudinal edges and said two curved wall portions, said resilient sheet element having a single piece structure, said spring mechanism also including means for retaining said resilient sheet element and including at least one retaining tab extending outward from said resilient sheet element;

a housing with an inner wall, all of said curved wall portions being fitted against said inner wall, said two flat parallel wall portions thereby being arranged so that a space forms between said two flat wall portions and said inner wall, said two flat parallel wall portions being formed to resiliently expand into said space to accommodate gripping the hinge rod between said two flat parallel wall portions to thereby retain a sun visor on the hinge rod in a desired angular position of use; and means for preventing a relative rotation of said resilient sheet element and said housing and including a projection formed in said housing and fitted between said free edges of said two curved wall portions in said aperture, said housing having a recess in which is engaged said retaining tab so as to restrain said resilient sheet element against axially moving in said housing, said housing having an end that is open, said resilient sheet element having an outer surface and being formed with a receiving area into which said at least one tab is depressible so that said tab extends outwardly no further than said outer surface of said resilient sheet element, said resilient sheet element being formed so as to be slidable into said housing through said end that is open while said at least one tab is depressed into said receiving area, said at least one tab being formed to engage said recess in said housing upon reaching said recess by snapping into engagement so as to prevent a withdrawal of said resilient sheet element from said housing.

7. The spring mechanism and housing as defined in claim 6, wherein said resilient sheet element has a longitudinal end, said housing having a wall against which said longitudinal end of said resilient sheet element abuts as said at least one tab reaches said recess.

8. The spring mechanism and housing as defined in claim 7, wherein said retaining means includes three such retaining tabs projecting respectively from said longitudinal curved wall portion and said two flat wall portions, said resilient sheet element having a longitudinal axis, said retaining tabs each diverging outward from said resilient sheet element in the same direction symmetrically at an acute angle with respect to said longitudinal axis, said resilient sheet element and all of said tabs having a single piece structure.

9. The spring mechanism and housing as defined in claim 8, wherein said resilient sheet element and said one tab is formed to have a single piece structure.

* * * * *